Sept. 15, 1970     R. J. LAYBOURN     3,528,309

MECHANICAL DRIVE

Filed Sept. 30, 1968

*INVENTOR*
ROBERT J. LAYBOURN

BY Gerald L. Moore

ATTORNEY

United States Patent Office 3,528,309
Patented Sept. 15, 1970

3,528,309
MECHANICAL DRIVE
Robert J. Laybourn, San Jose, Calif., assignor to International Business Machines Corporation, Armonk, N.Y., a corporation of New York
Filed Sept. 30, 1968, Ser. No. 763,730
Int. Cl. F16h *13/10, 15/00, 57/00*
U.S. Cl. 74—404                                  11 Claims

ABSTRACT OF THE DISCLOSURE

A mechanical drive for providing either multispeed or reversible drive of an output shaft wherein a driven element is positioned for movement of the periphery thereof into contact with the periphery of either of two spaced drive elements rotating about parallel axes. Thus, the driven element is rotated at a speed and in a direction responsive to that of the contacted drive element peripheral speed and direction.

BACKGROUND OF THE INVENTION

Field of the invention

This invention relates to drive mechanisms of the type wherein a single-speed rotating shaft can be used to drive the mechanism with the output shaft thereof being selectively driven in either two directions or two rotational speeds.

Description of the prior art

In reversible drives, the most frequently used mechanisms are clutches and gears for alternating the drive direction or speed of the output shaft. However, with gears, there naturally exists the problem of meshing the teeth for engagement. Additionally, in clutching mechanisms of the face plate type, wear and speed of actuation frequently are limiting factors, especially where quick acting mechanisms are desired.

In such devices as printers where a movable head is translated across a recording member, quick acting and positive acting reversible drive mechanisms are necessary. Additionally, noise and reliability are important factors to be considered in such drives. With these needs in mind, it is the primary object of this invention to provide a reversible drive mechanism particularly suited for but not limited in use to driving a printing head in its translatory motion across a record member.

Another object of this invention is to provide a quick acting, quiet operating and reliable drive mechanism capable of permitting an output shaft to be driven in opposite directions and at preselected speeds from a single speed input shaft. A further object of this invention is to provide a mechanism for converting an oscillatory motion into a rotary drive motion.

SUMMARY OF THE INVENTION

A reversible drive mechanism havingone shaft constantly rotated and another shaft driven with an oscillatory motion and including a pair of spaced, peripheral drive clutch wheels driven in opposite directions with the constantly rotated shaft and a single mating clutch wheel positioned therebetween on a pendulum mechanism such that it can be swung into contact alternately with either of the other clutch wheels to transmit the motion of that wheel to the other shaft.

DESCRIPTION OF THE PREFERRED EMBODIMENTS

Figure 1:
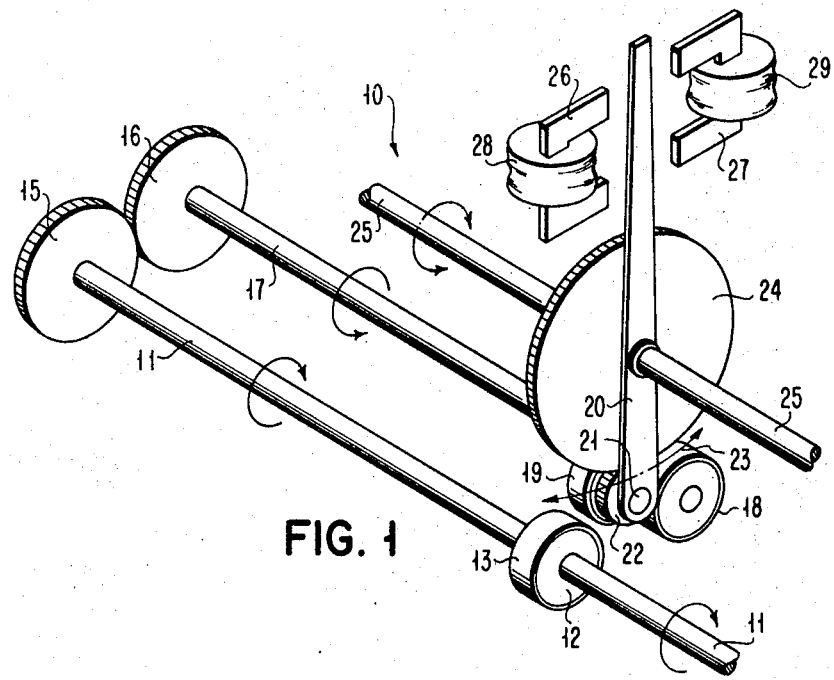
FIG. 1 is a perspective view of one embodiment of the invention.
Figure 2:
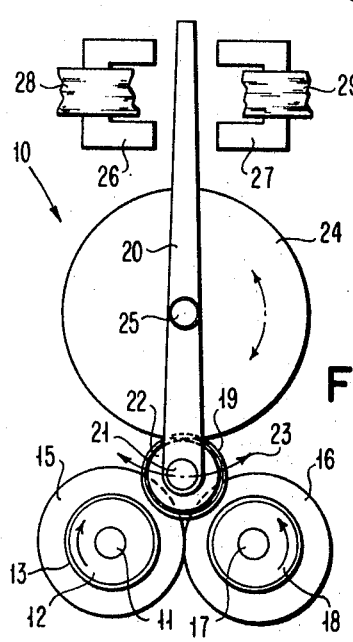
FIG. 2 is an end view of the embodiment shown in FIG. 1.

In FIGS. 1 and 2 is shown the preferred embodiment of the invention used in this instance for converting the rotary motion of a driven input shaft into a reversible rotary motion for driving an output shaft. In this embodiment, the mechanism 10 comprises an input shaft 11 which is driven in one direction (shown to be the clockwise direction in the drawing). Intermediate the shaft ends is fixed a clutch drive wheel 12 having an outer peripheral surface 13 which is engageable for transmitting torque to a similar wheel in contact therewith. At the end of the shaft is located a gear 15 meshed with a similar counter-rotating gear 16 fixed to the end of a second shaft 17. Thus, by driving the shaft 11 in one direction, the second shaft 17 is rotated in the opposite direction.

Fixed to the shaft 17 is a second clutch drive wheel 18 similar to and rotating about an axis parallel to that of the clutch wheel 12. The clutch wheels are spaced apart and are rotating substantially in the same plane. Positioned in the same plane and between the clutch wheels is a third clutch drive wheel 19 supported to rotate about an axle 21 on a pendulum arm 20. A first drive element in the form of a gear 22 also is fixed for rotation with the clutch wheel on the axle. Engaged with the gear 22 and serving for power takeoff means is a second drive element or gear 24 affixed to an output shaft 25 about which the pendulum arm pivots at an intermediate position. By supporting the gear 24 at the pivot axis of the arm 20, the gear remains meshed with the gear 22 as the arm is pivoted. The opposite end of the pendulum arm extends between a pair of electromagnets 26 and 27 having coils 28 and 29 respectively. By energization of either of the coils, the electromagnet attracts the end of the pendulum arm to the related magnetic holder thereby swinging the clutch wheel 19 in a direction normal to the axes of rotation of the clutch drive wheels 12 and 18. In this manner, the wheel 19 is moved into driving engagement with one or the other of the clutch drive wheels.

In operation, the shaft 11 is driven in a desired direction resulting in the clutch wheels 12 and 18 rotating in opposite directions. By actuation of one of the electromagnets 26 or 27, the wheel 19 is engaged with a selected one of the clutch drive wheels to rotate the gears 22 and 24 for driving the output shaft in one of the other directions. The drive 10 thereby presents a simple and efficient mechanical drive having reversible drive capability acting responsive to actuation of the extending end of the pivot arm 20.

In accordance with another feature of the invention, the mechanism is made fail-safe in that with no actuating force applied to the pivot arm 20, the clutch automatically disengages to prevent the driving of the output shaft 25. To accomplish this, the arcuate path 23 through which the clutch wheel 19 is moved extends slightly to one side of the axes of rotation of each of the clutch drive wheels 12 and 18 and the drive wheels are driven so that the surfaces to the same side of the axes as takeoff wheel 24 are rotating toward each other. In this manner, the action of the drive wheels in the absence of a force being applied on the pivot arm 20 tends to push the driven wheel 19 away from the drive wheel with which it is engaged to a center position resulting in no power transfer to the output shaft 25. Also, if the output shaft is locked against turning, the clutch drive wheels will slip due to the same forces tending to push the wheels apart thereby preventing the mechanism from being damaged by impressing excessive torque forces on the drive shaft. An additional function of this mechanism results if the clutch drive wheels 12 and 18 are geared to be driven in the same direction but are driven at different speeds. This can be accomplished either by driving the driveshafts at different speeds or by making the clutch wheels of different sizes. Thus, a two-speed, two-direction drive is effected on the output shaft 25 with the same mechanism for actuating the clutch driven wheel.

Figure 3:
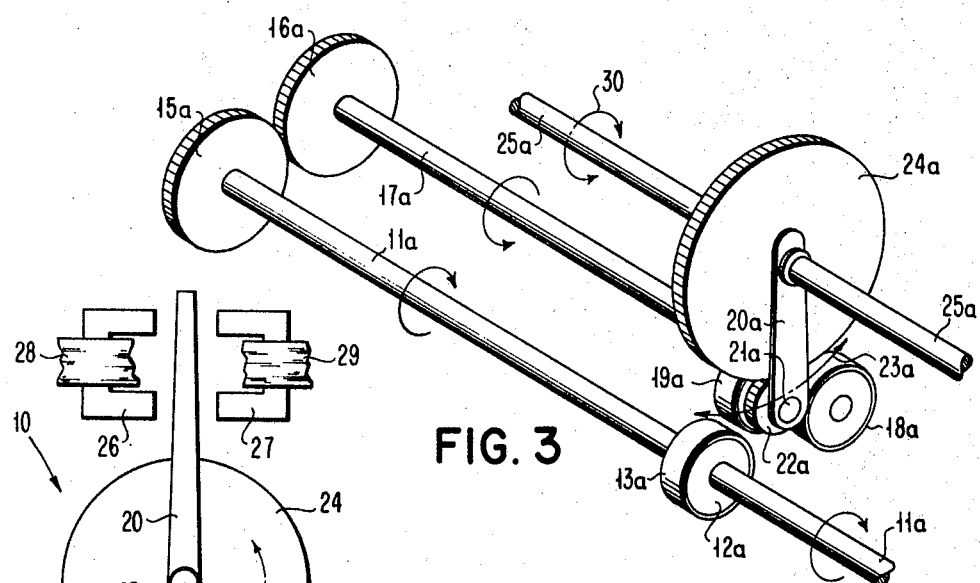
FIG. 3 is a second embodiment of the subject invention.

A second embodiment of the invention is shown in FIG. 3 wherein the input drive force is an oscillatory motion applied to the shaft 25a (corresponding to the output shaft 25 of the previous embodiment) and the output drive of the mechanism is a unidirectional rotation of the shaft 11a (corresponding to the input shaft 11 of the previous embodiment). According to this feature of the invention, the clutch drive wheels 12a and 19a and the connecting gears 15a and 16a correspond to the components having the same numerical designations (without the alphabetical suffices) in the previous embodiment. The pendulum arm 20a has the extending end and actuators removed for simplification, however the original arm shown in FIG. 1 would function the same.

The input drive of this mechanism is in the form of an oscillatory motion applied to the shaft 25 serving as a drive element and causing the gear 24a to oscillate. Because of the lever arm principle applied to the arm 20a and the normal inertia forces resisting rotation of the gear 22a and the clutch wheel 19a, the arm is pivoted until the wheel contacts one of the wheels 12a and 18a. With pivotal rotation of the arm now stopped, the gear 22a and clutch wheel 19a now are rotated to form the abutting wheel 12a or 18a thereby rotating the shaft 11a.

With reversal of the direction of rotation of the shaft 25a, the arm 20a swings away from the contacted clutch wheel into engagement with the other clutch wheel and the same sequence of events follows to again rotate the shaft 11a in the same direction as before. Thus a constant rotation of the shaft 11a is obtained by an oscillatory driving of the shaft 25a.

While the invention has been particularly shown and described with reference to preferred embodiments thereof, it will be understood by those skilled in the art that various changes in the form and details may be made therein without departing from the spirit and scope of the invention.

What is claimed is:

1. A drive mechanism comprising:
two spaced drive wheels rotating in the same plane about parallel rotational axes,
a third drive wheel having power takeoff means in constant driving engagement therewith,
pendulum means for supporting said third wheel for engagement of the periphery thereof with the periphery of either of the two drive wheels,
said two drive wheels being rotatable with the periphery adjacent the third wheel pendulum arm being moved towards the third wheel thereby tending to move the third wheel away from contact therewith when being driven, whereby
said third wheel is driven at a speed and rotational direction dependent upon the peripheral speed and direction of rotation of said engaged one of the two drive wheels.

2. The drive mechanism as defined in claim 1 wherein said pendulum means comprises:
a support arm having said third drive wheel mounted for rotation thereon; and
means remote to said wheel for mounting said arm for pendulum movement of the third wheel into engagement with either of said two spaced drive wheels.

3. The drive mechanism as defined in claim 2 wherein means for mounting said pendulum means comprises a drive shaft on which said pendulum is pivotally mounted.

4. The drive mechanism as defined in claim 3 including a drive element in driving engagement with said third drive wheel.

5. The drive mechanism as defined in claim 4 wherein said drive element is fixed for rotation on the drive shaft on which the arm is mounted.

6. The drive mechanism as defined in claim 5 including another drive element in driving engagement with said third drive wheel and in turn in driving engagement with the drive element fixed on the drive shaft.

7. The drive mechanism as defined in claim 2 wherein said spaced drive wheels are rotated in opposite directions thereby serving to reverse the direction of rotation of said third drive wheel as it is moved alternately into contact with said two drive wheels.

8. The drive mechanism as defined in claim 1 including actuator means for moving said pendulum arm to shift the third wheel selectively into engagement with either of the spaced drive wheels.

9. A drive mechanism comprising:
a pair of rotatable shafts connected to rotate together and in opposite directions;
a pair of drive wheels fixed one to each shaft for rotation in the same plane and in spaced relationship;
a support arm fixed to pivot about a fixed axis;
a third drive wheel supported for rotation about an axis on said arm at a point spaced from the pivot axis and positioned to be moved into driving engagement with the periphery of either of the drive wheels as the arm is pivoted about its support axis and with the arcuate path of the third drive wheel being spaced from the axis of rotation of said pair of drive wheels;
a first drive element supported for rotation about the fixed axis of said support arm and in driving engagement with said third drive wheel, whereby
an oscillatory motion applied to said drive element will alternately force the third drive wheel into driving engagement with said pair of drive wheels resulting in a unidirectional rotation of said pair of rotatable shafts.

10. A drive mechanism comprising:
two spaced drive wheels rotating in the same plane about parallel rotational axes,
a third drive wheel having power takeoff wheel means in constant driving engagement therewith;
pendulum means for supporting said third drive wheel and said power takeoff wheel and for moving the periphery of said third wheel into engagement with the periphery of either of said two wheels;
drive means for driving said two wheels with the periphery adjacent said takeoff wheel being moved toward said third wheel thereby tending to move the third wheel away from the engaged one of said two wheels when being driven.

11. A drive mechanism comprising:
two rotatable shafts connected to rotate together and in opposite directions;
two drive wheels fixed one to each shaft for rotation in the same plane and in spaced relationship;
a support arm pivotable about an axis;
a third drive wheel supported for rotation about an axis on said arm at a point spaced from the pivot axis and positioned to be moved into driving engagement with the periphery of either of the drive wheels as the arm is pivoted about its support axis;
a first drive element supported in driving engagement with said third wheel; whereby
an oscillatory motion applied to said drive element will alternately force the third drive wheel into driving engagement with said pair of drive wheels resulting in a unidirectional rotation of said pair of rotatable shafts.

References Cited
UNITED STATES PATENTS
2,689,618  9/1954  Jezler _____ 74—202 X
3,211,014  10/1965  Sanderson _____ 74—202 X

FOREIGN PATENTS
815,870  7/1937  France.

LEONARD H. GERIN, Primary Examiner

U.S. Cl. X.R.

74—205, 213